(12) United States Patent
Edlund et al.

(10) Patent No.: US 6,546,388 B1
(45) Date of Patent: Apr. 8, 2003

(54) METADATA SEARCH RESULTS RANKING SYSTEM

(75) Inventors: Stefan B. Edlund, San Jose, CA (US); Michael L. Emens, San Jose, CA (US); Reiner Kraft, Gilroy, CA (US); Jussi Myllymaki, San Jose, CA (US); Shanghua Teng, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/483,344

(22) Filed: Jan. 14, 2000

(51) Int. Cl.[7] .............................................. G06F 17/30
(52) U.S. Cl. ........................ 707/5; 707/2; 707/4; 707/3
(58) Field of Search ......................................... 707/1–5

(56) References Cited

U.S. PATENT DOCUMENTS

| | | | | |
|---|---|---|---|---|
| 5,855,015 A | * | 12/1998 | Shoham ........................ 707/5 |
| 6,026,388 A | * | 2/2000 | Liddy et al. .................... 707/1 |
| 6,029,195 A | * | 2/2000 | Herz ........................... 709/219 |
| 6,098,064 A | * | 8/2000 | Pirolli et al. .................... 707/2 |

\* cited by examiner

Primary Examiner—Kim Vu
Assistant Examiner—Cam-Y T Truong
(74) Attorney, Agent, or Firm—Jon A. Gibbons; Fleit, Kain, Gibbons, Gutman & Bongini P.L.

(57) ABSTRACT

A method for presenting to an end-user the intermediate matching search results of a keyword search in an index list of information. The method comprising the steps of: coupling to a search engine a graphical user interface for accepting keyword search terms for searching the indexed list of information with the search engine; receiving one or more keyword search terms with one or more separation characters separating there between; performing a keyword search with the one or more keyword search terms received when a separation character is received; and presenting the number of documents matching the keyword search terms to the end-user presenting a graphical menu item on a display. A system and method of metadata search ranking is disclosed. The present invention utilizes a combination of popularity and/or relevancy to determine a search ranking for a given search result association.

20 Claims, 4 Drawing Sheets

METADATA SEARCH RESULTS RANKING SYSTEM

CROSS-REFERENCE TO RELATED APPLICATIONS

Not applicable

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates generally to field of Internet Search Engines, Web browsers, and resource gathering and has special application in situations where these functions must be implemented in extremely large networks.

2. Description of the Related Art

The World-Wide-Web ("Web") has become immensely popular largely because of the ease of finding information and the user-friendliness of today's browsers. A feature known as hypertext allows a user to access information from one Web page to another by simply pointing (using a pointing device such as a mouse) at the hypertext and clicking. Another feature that makes the Web attractive is having the ability to process the information (or content) in remote Web pages without the requirement of having a specialized application program for each kind of content accessed. Thus, the same content is viewed across different platforms. Browser technology has evolved to enable the running of applications that manipulate this content across platforms.

The Web relies on an application protocol called HTML (Hyper-Text Mark Up Language), which is an interpretative scripting language, for rendering text, graphics, images, audio, real-time video, and other types of content on a Web compliant browser. HTML is independent of client operating systems. Therefore, HTML renders the same content across a wide variety of software and hardware operating platforms. The software platforms include without limitation Windows 3.1, Windows NT, Apple's Copeland and Macintosh, and IBM's AIX and OS/2, and HP Unix. Popular compliant Web-Browsers include without limitation Microsoft's Internet Explorer, Netscape Navigator, Lynx, and Mosaic. The browser interprets links to files, images, sound clips, and other types of content through the use of hypertext links.

A Web site is a related collection of Web files that includes a beginning file called a home page. A Web site is located a specific URL (Uniform Resource Locator). Web site usually start with a home page from which a user can link to other pages. Online URL http://www.ibm.com is one example of a home page.

Users of the Web use tools to help find, location or navigate through the Web. These tools are known as Internet search engines or simply search engines. Almost all search engines provide graphical user interfaces (GUIs) for boolean and other advanced search techniques from their private catalog or database of Web sites. The technology used to build the catalog changes from site to site. The use of search engines for keyword searches over an indexed list of documents is a popular solution to the problem of finding a small set of relevant documents in a large, diverse corpus. On the Internet, for example, most search engines provide a keyword search interface to enable their users to quickly scan the vast array of known documents on the Web for the handful of documents which are most relevant to the user's interest.

There are several examples of search engines including tools called Internet search engines or simple search engines Yahoo (http://www.yahoo.com), AltaVista (http://www.altavista.com), HotBot (www.hotbot.com), Infoseek (http://www.infoseek.com), Lycos (http://www.lycos.com) WebCrawler (www.webcrawler.com) and others. The results of a search are displayed to a user in a hierarchically-structured subject directory. Some search engines give special weighting to words or keywords: (I) in the title; (ii) in subject descriptions; (iii) listed in HTML META tags, (iv) in the position first on a page; and (iv) by counting the number of occurrences or recurrences (up to a limit) of a word on a page. Because each of the search engines uses a somewhat different indexing and retrieval scheme, which is likely to be treated as proprietary information. Refer to online URL http://www.whatis.com for more information on search engines.

In its simplest form, the input to keyword searches in a search engine is a string of text that represents all the keywords separated by spaces. When the "search" button is selected by the user, the search enginefinds all the documents which match all the keywords and returns the total number that match, along with brief summaries of a few such documents. There are variations on this theme that allow for more complex boolean search expressions.

The problem present with the prior art is the inherent difficulty for web crawlers to adequately search, process, rank, and sort the vast amounts of information available on the Internet. This information content is increasing at an exponential rate, making traditional search engines inadequate when performing many types of searches.

At least one metadata search system ("Direct Hit" www.directhit.com) determines the most popular and relevant sites for a given Internet search request based on the number of direct hits that the site receives. However, these systems simply sort the results of the search based on the hits to those results (their hit count is simply a raw hit count—not associated with the original search query). Accordingly, a need exists to provide a system and a method to associate search results with a specific search query string.

As stated previously, with the volume of data available on the Internet increasing at an exponential rate, the search effort required to obtain meaningful results on the Internet is also increasing exponentially, thus triggering a need for more efficient search methodologies. Accordingly, a need exists to provide a system and method to permit improvement in the search ranking efficiency of current web search engines.

General Advantages

The present invention typically provides the following benefits:

Time Savings. Reading through the abstracts of a result page is a time consuming task. The sorting mechanism of the present invention brings the most popular resources for a particular query to the top of the list of the result page. Because users usually start from the beginning of a list, they save time reading abstracts. The popular ones might already be the best fit for their query and they can stop evaluating and reading more abstracts of the result page.

Leveraging Human Interaction. The resources are usually sorted by relevance (matching the original query string). Indexing is done mostly automatically. The present invention uses the human's ability to evaluate resources and store this information for further reuse. Users choose to access result items (by clicking on a hyperlink usually) after they evaluated the abstract of a result item and think that this could be a good match (for the query they issued before). This human knowledge is automatically collected and can then be reused by other users. Therefore, resources that are more often reviewed and visited will have a higher ranking. Thus, the search quality is improved by integrating human evaluation capabilities.

One skilled in the art will realize that these advantages may be present in some embodiments and not in others, as well as noting that other advantages may exist in the present invention that are not specifically listed above.

SUMMARY OF THE INVENTION

Briefly, in accordance with the present invention, a method for presenting to an end-user the intermediate matching search results of a keyword search in an index list of information. The method comprising the steps of: coupling to a search engine a graphical user interface for accepting keyword search terms for searching an indexed list of information with a search engine; receiving one or more keyword search terms with one or more separation characters separating there between; performing a keyword search with the one or more keyword search terms received when a separation character is received; and presenting the number of documents matching the keyword search terms to the end-user, presenting a graphical menu item on a display.

In accordance with another embodiment of the present invention, an information processing system and computer readable storage medium is disclosed for carrying out the above method.

The present invention incorporates a document relevance measure that accounts for the change in Web content and therefore improves the quality of results returned to users. Three measures are combined when calculating the overall document relevance: (a) content relevance (e.g. matching of query search terms to words in document), (b) version-adjusted popularity (e.g. number of accesses to each version of the document), and (c) recency (e.g. age and update frequency of a document). With this information the present invention provides a ranking system that performs a ranking based on a combination of relevancy and popularity.

An overall example of this present invention is now described. User Z is looking for a particular and efficient Quicksort algorithm. He/She uses search engines with enhanced features to construct a complex query. The result page contains 100 external resources (URLs), which contain hyperlinks to various implementations of the search features of the present invention. User Z now begins to read through the abstracts provided and eventually chooses one result item for closer examination. Thus, User Z selects a hyperlink pointing to the external resource. Typically the document is downloaded into a viewing device (e.g. a web browser) and then User Z is able to further examine the whole document. When User Z is done with reviewing the document, he/she might also select other links to resources on the result pages for further review, which look promising. The present invention examines the user's behavior by monitoring all the hyperlinks the user clicks on. Every time the user clicks on a hyperlink on a result page, the present invention associates this particular resource with User Z's original search query and store this information (<user query, URL> pair) in a database system.

User Y later uses the system independently using the search features of the current invention and enters the same query using the same search engine features as User Z. The present invention forwards the request to the search engine, which retrieves the matching resources. However, before returning the matching resources to User Y, the present invention checks to see if these resources were chosen by User Z (which issued a similar query). If a resource was chosen by another user (e.g., User Z) that issued a similar query then a popularity vector is calculated. All resources are then sorted by popularity first, then by relevance, and then returned to User Y. Note that User Y's result page now contains result items first that were chosen by User Z (who performed a similar query). In summary, the present invention stores the original query of the user and associates its further resource selection to this query.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF AN EMBODIMENT

Figure 1:
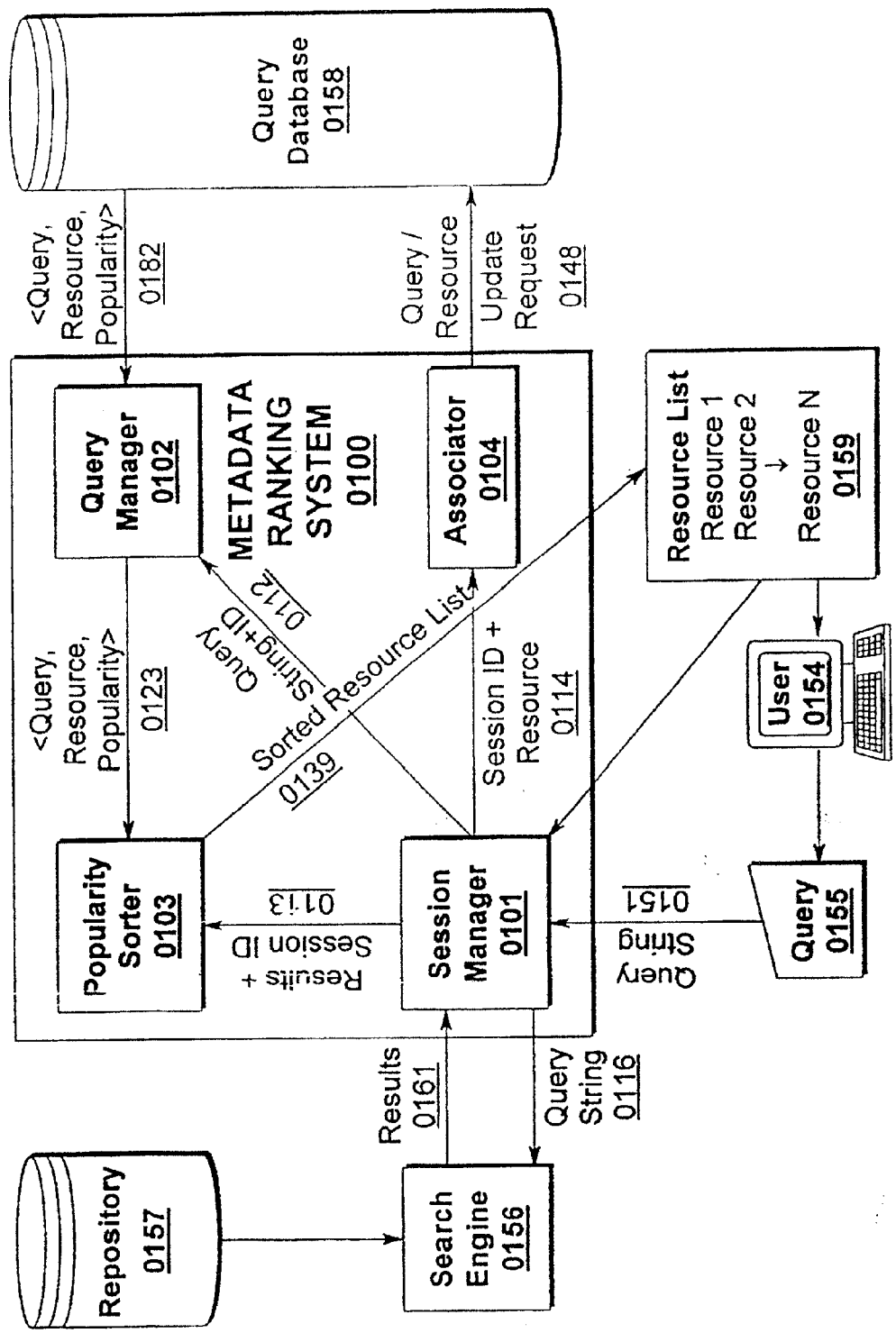
FIG. 1 illustrates a system block data flow diagram of an exemplary embodiment of the present invention.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

Definitions

Throughout the discussion in this document the following definitions will be utilized:

System Blocks/Procedural Steps Not Limitive—The present invention may be aptly described in terms of exemplary system block diagrams and procedural flowcharts. While these items are sufficient to instruct one of ordinary skill in the art the teachings of the present invention, they should not be strictly construed as limiting the scope of the present invention. One skilled in the art will be aware that system block diagrams may be combined and rearranged with no loss of generality, and procedural steps may be added or subtracted, and rearranged in order to achieve the same effect with no loss of teaching generality. Thus, it should be understood that the present invention as depicted in the attached exemplary system block diagrams and procedural flowcharts is for teaching purposes only and may be reworked by one skilled in the art depending on the intended target application.

Personal Computer Not Limitive—Throughout the discussion herein there will be examples provided that utilize personal computer (PC) technologies to illustrate the teachings of the present invention. The term 'personal computer' should be given a broad meaning in this regard, as in general any computing device may be utilized to implement the teachings of the present invention, and the scope of the invention is not limited just to personal computer applications. Additionally, while the present invention may be implemented to advantage using a variety of Microsoft™ operating systems (including a variety of Windows™ variants), nothing should be construed to limit the scope of the invention to these particular software components. In particular, the system and method as taught herein may be widely implemented in a variety of systems, some of which may incorporate a graphical user interface.

Internet/intranet Not Limitive—Throughout the discussion herein the terms Internet and Intranet will be used generally to denote any network communication system or environment. Generally the term Intranet will denote communications that are local to a given system or user, and Internet will describe communications in a more distant local. One skilled in the art will recognize that these terms are arbitrary within the contexts of modern communication networks and in no way limitive of the scope of the present invention.

System

An Embodiment of the Hardware and Software Systems

Generalized Exemplary System Architecture (0100)

Referring to FIG. 1, the exemplary search ranking system (0100) comprises of the following components: Session Manager (0101); Query Manager (0102); Popularity Sorter (0103); Association (0104); and Query Database (0158).

These system elements will now be described in detail.

Session Manager (0101)

When a user (0154) issues a search query (0155), the actual query string (0151) is first passed to the Session Manager (0101). A Session Manager is a component that keeps track of user sessions. It uses standard web technologies to store state and session information (e.g. Cookies, Active Server Pages, etc.).

The primary function of the Session Manager (0101) is to interact with users. It receives search requests. It also handles requests for external resources from a search result page (selection of search result item). The overall task is to identify users and manage their sessions. This is necessary because the web architecture and its underlying HTTP protocol is stateless. There are several ways to manage sessions. For instance the Session Manager (0101) can make use of "cookies", which is data in form of attribute-value pair, which can be stored within the user's viewer (web browser). Further requests are then identified reading the cookie. The Session Manager (0101) decides, whether the request is a search request or a view request. In case of a search request, the user query is forwarded to the search engine, which works closely together with the present invention. Otherwise, a view request is forwarded to the Monitor Agent.

After retrieving session information, the Session Manager forwards (0116) the original user query string to the search engine system (0156). Moreover, it also forwards Query and String ID (0112) the user query to the Query Manager (0102) component along with the retrieved session ID. When the search engine system returns the search results (0161), it retrieves these results, add the session information to it and forward (0113) the results to the Popularity Sorter (0103).

The search engine (0156) may be any kind of standard search engine. A search engine calculates the content relevance as described herein, and return a list of search results ranked based on this content relevance. The present invention does not require a specific search engine. One skilled in the art will recognize that search engine component may be replaced with a different search engine component, as long as the task of calculating content relevance is performed.

Additionally the Session Manager (0101) component receives requests (0151) from users (0154), which are addressed to the Association (0104) (typically resource viewing requests). These requests are from users, who want to access a resource in the result page of a search. All user requests will be intercepted from the Session Manager (0101), which handles session state and associates this state to all requests. If a request destination is for the Association, the Session Manager (0101) forwards (0114) the request and attach a session ID to it.

Query Manager (0102)

The Query Manager (0102) receives a user query string (0112) along with a session ID from the Session Manager (0101). It uses this to query the Query Database (0158) system for the particular query string. All vector items, <query string, resource pointer (URL), popularity>, such as that match the user query string are returned from the Query Database (0158) system. The Query Manager (0102) then creates a list of the resources with the associated popularity vector, and adds the session information to it. This is then passed as a result to the Popularity Sorter (0103). If there are no resources matching the user query, an empty list along with the session ID is passed to the Popularity Sorter (0103). In general the popularity information is ranking information that indicates the popularity of a given resource. The popularity vector is discussed in more detail later in this document.

Additionally, the Query Manager (0102) also stores the original query string (0151) of the user (0154) temporarily for later reuse. This information (user ID and associated query), is later used by the Association (0104) component, to associate the actions a user performed (selecting resources) and combining these with the original query string (0116).

Popularity Sorter (0103)

Finally, the Popularity Sorter (0103) starts working when it has two information sets available. First, there is the result set from the search engine system (0113) that contains all the resources (or pointer to resources, URLs), which matched the original user query along with ranking information. Additionally, it has the session ID, so that it will be able to associate the result set with a particular session (user). Second, the Popularity Sorter (0103) will receive a list of resources (pointer to resources, URLs) (0123), along with a popularity vector, and the session ID from the Query Manager (0102) component. It then merges result items that belong to the same session and applies a sorting algorithm.

The sorting algorithm is described in more detail later below. Basically it sorts resources with a higher popularity vector on top of the list, followed by the rest of the result set resources ranked by relevance (using the provided ranking information). After the Popularity Sorter (0103) has finished, it will generate a document containing the sorted results (based on popularity) and return the document to the user who issued the query.

Association (0104)

The Association (0104) is a component that monitors the user's behavior when the user has received the document containing the result items (result page) from the Popularity Sorter (0103). All hyperlinks (pointer to resources) in the result page contain a URL to the Association (0104). The Association (0104) retrieves the user request from the Session Manager (0101). A request consists of a session ID and a resource URL (pointer). First, the Association (0104) performs a query in the Query Database (0158) system, and retrieves the original query that the user entered to query the result set, with which the user is currently working (current result page). It then creates a <query, resource> vector pair by associating the original query with the resource the user has indicated interest, and adds this new item to the Query Database (0158) system.

When this is done, it creates a HTTP request for the original resource in which the user has interest, waits for the document, and returns the document back to the user. This behavior can be described also as a proxy. The Association (0104) is an intermediary between the user and the requested document server.

Popularity Vector

In its simplest case, the popularity vector is a single element vector simply keeping track of the number of times a resource has been accessed (with regard to a particular query). A statistic R is set to this number, representing the relevance of the resource.

An extension of this concept is to add a second element to the popularity vector, representing the number of times the resource has been shown to the user but ignored. The R statistic is now computed as the weighted square sum of the two components, i.e.

$$R = W_1 V_1^2 + W_2 V_2^2$$

where the weights $W_1$ and $W_2$ describe the importance of the two vector elements $V_1$ and $V_2$. Observe that $W_2$ is negative, and thus when a resource is ignored the relevance of the resource is decreased accordingly.

A frequent feature of search engines is to be able to associate a ranking with each resource returned by a query. The ranking simply specifies an estimation of how well the resource matches the query, and can typically be expressed in percent. A third extension of the popularity vector concept is to add this number to the popularity vector, i.e.

$$R = W_1 V_1^2 + W_2 V_2^2 + W_3 V_3^2$$

Using this technique, the system can handle any number quantifiers for resource relevance or irrelevance. Of course, any number of vector metrics may be applied to the system to generate an appropriate popularity vector statistic R. See David G. Luenberger, OPTIMIZATION BY VECTOR SPACE METHODS (LOC 68-8716 SBN 471 55359x, 1969); L. E. Franks, SIGNAL THEORY (ISBN 0-941052-00-7, 1981); Erwin Kreyszig, ADVANCED ENGINEERING MATHEMATICS (ISBN 0-471-85824-2, 1988).

Popularity Sort Algorithm

Resources are sorted using a fairly simple algorithm. Each resource returned has an associated popularity vector. For each popularity vector, a relevance statistic R is computed as described previously. The resources are then sorted on the result form from the highest relevance to the lowest.

Alternate Exemplary System Architecture (0200)

Figure 2:
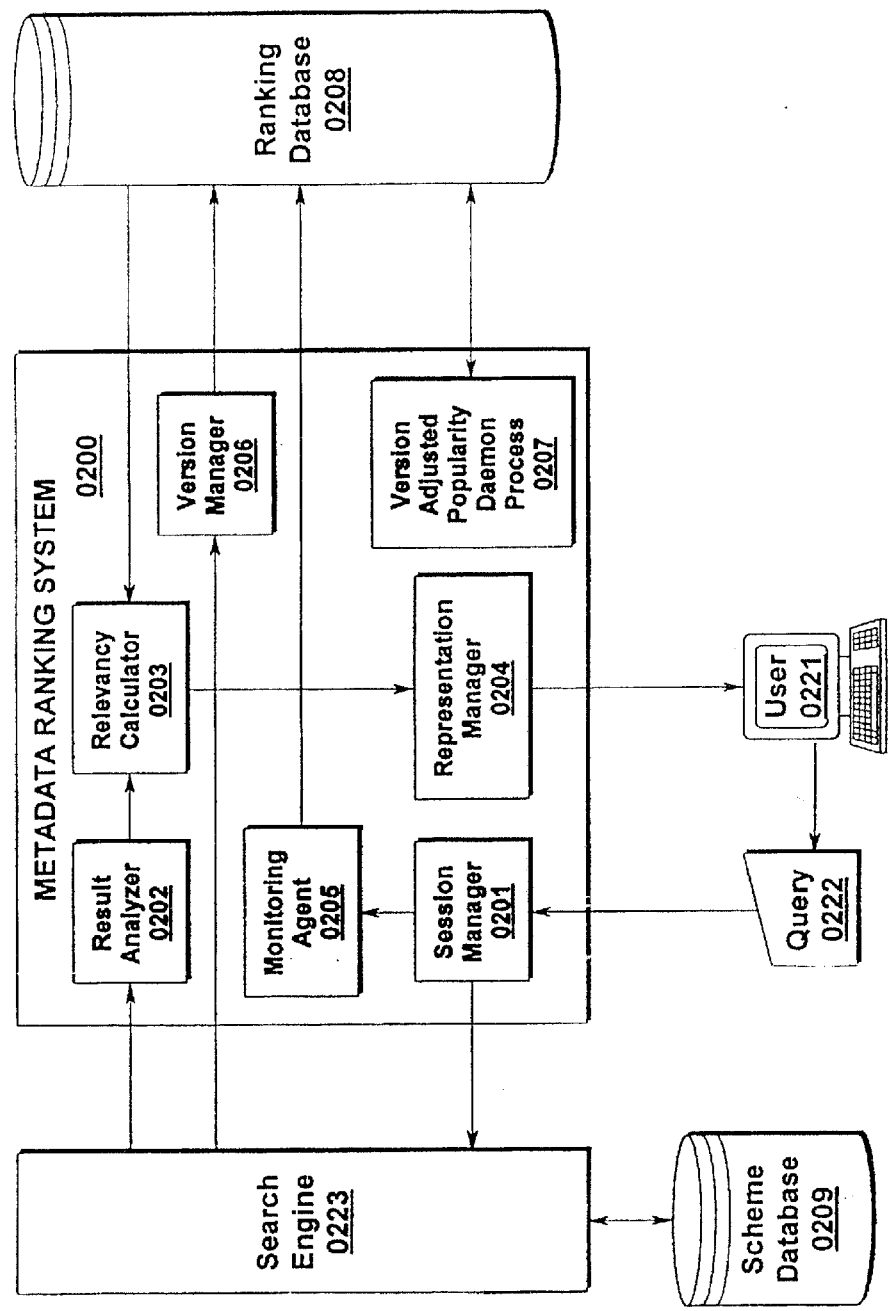
FIG. 2 illustrates a system block data flow diagram of an alternate exemplary embodiment of the present invention.

Referring to FIG. 2, an alternate embodiment of the search ranking system (0200) may comprise the following components: Session Manager (0201); Result Analyzer (0202); Relevancy Calculator (0203); Representation Manager (0204); Monitor Agent (0205); Version Manager (0206); Daemon Process for calculating the version-adjusted popularity (0207); and Ranking Database (0208); Scheme Database for Search Engine interaction (0209). These system elements will now be discussed in detail.

Session Manager (0201)

First, the Session Manager (0201) will interact with users. It receives search requests. Additionally, it handles requests for external resources from a search result page (selection of search result item). The overall task is to identify users and manage their sessions. This is necessary because the web architecture and its underlying HTTP protocol is stateless. There are several ways to manage sessions. For instance the Session Manager can make use of "cookies" (data in form of attribute-value pair) that can be stored within the user's viewer (web browser). Further requests can then be identified reading the cookie. The Session Manager will decide, whether the request is a search request or a view request. In case of a search request, the user query is forwarded to the search engine, which works closely together with the invention. Otherwise a view request is forwarded to the Monitor Agent (0205).

The search engine can be any kind of standard search engine. A search engine essentially will calculate the content relevance (more details see below), and return a list of search results ranked based on this content relevance. This invention does not require a specific search engine. One skilled in the art could replace the search engine component with a different search engine component as long as the task of calculating content relevance is performed.

Result Analyzer (0202)

The search engine returns search results based on the original query. These search results are typically sorted ascending or descending based on content relevance. The search result list contains unique identifiers for search result items (e.g., URL), along with some abstract and additional information for each search result item. To identify all the data properly, the Result Analyzer (0202) will use a scheme description from the Scheme Database (e.g. a DTD) (0209). The scheme describes the search result list and how to interpret it. The scheme can be obtained from the search engine provider or has to be created manually once. As a result the Result Analyzer (0202) will generate a list data structure, containing the search result items, along with their content relevance. This generated list will then be passed to the Relevancy Calculator (0203).

Relevancy Calculator (0203)

The Relevancy Calculator (0203) component receives a list of search result items along with an associated content relevancy ranking value from the Result Analyzer (0202). The Relevancy Calculator (0203) will then query the Ranking Database (0207) for each search result item to determine the value of: (a) Version Adjusted Popularity, and (b) Document Recency.

After this has been accomplished for each search result item the value of the content relevance is obtained, along with the value of the version adjusted popularity and the document recency. Note that the age of the document is dynamically calculated from the retrieved data in the Ranking Database (0207). With this information, the Relevancy Calculator (0203) is able to compute a ranking of the search result items using the algorithm described below. As a result the Relevancy Calculator (0203) will associate a ranking number to each search result item, and forward this list to the Representation Manager (0204).

Representation Manager (0204)

The Representation Manager (0204) generates a client side representation of the search results. It receives a list of ranked search result items from the Relevancy Calculator (0203) along with additional data of each search result item. Depending on the client's viewer capabilities, a search result page is generated. For instance, if the client uses a web browser from Microsoft (e.g. IE5), an optimized version for this particular web browser is generated and returned to the user.

Monitor Aqent (0205)

The Monitor Agent (0205) component monitors the user's selections of search results. Every time the user selects a search result item for further viewing from the list of results, the Session Manager (0201) receives this request and passes it to the Monitor Agent (0205). The Monitor Agent (0205) will then update the Ranking Database (0207) in the following manner.

The Monitor Agent (0205) uses the selected URL together with the most recent version (number zero) as a primary key to update the counter for the popularity of the most recent version of the URL. Note the most recent version of a document has version number zero, followed by version 1 to N, where N is the oldest version. The record set is modeled like a stack (First In—Last Out). Only the popularity counter of the top most version of a URL is increased. An example of a record set illustrates this concept:

| URL | Version | Popularity Count |
| --- | --- | --- |
| http://www.ibm.com/myfile.htm | 0 | 49 |
| http://www.ibm.com/myfile.htm | 1 | 178 |
| http://www.ibm.com/myfile.htm | 2 | 290 |
| http://www.ibm.com/myfile.htm | 3 | 122 |

The URL here in this record set is the same for all four records. The document itself has 4 different versions, where version 0 is the most recent one. The popularity count shows how many times a particular version of a document was visited by a user. The Monitor Agent (0205) will increase only the popularity counter of version zero, if a user selects the specified URL in the search result list. Document changes that will add additional versions to a document, are handled by the Version Manager (0206) component.

Version Manaqer (0206)

Every time a document change is detected by the search engine (0223), the Version Manager (0206) receives a notification of this change. Note that there are several ways of how a search engine (0223) can detect document changes. These will not be described in more detail, because different search engines may use different approaches to accomplish this task. Once the Version Manager (0206) knows that a particular URL was changed, it updates the existing record set of the URL by increasing each version number by one, starting with the highest version number first. Finally, a new record with version number zero is created, which represents the most recent version.

Version Adjusted Popularity Daemon Process (0207)

A Version Adjusted Popularity Daemon Process (0207) calculates the version-adjusted popularity offline and stores it in a data field within the Ranking Database (0208). This background processing is done for efficiency reasons, and is not a mandatory component of the system.

Ranking Database (0208)

The Ranking Database (0208) contains all the data the present invention needs to calculate the version adjusted popularity and the document recency. One table within this database uses the URL and the version number (0 to N) as a primary key. The value for each record is the number of hits used to count the popularity.

A second table only uses the URL as a primary key. One value to store is the time stamp (when the document was created). This is used to calculate the document recency.

Exemplary General Ranking Method

Figure 3:
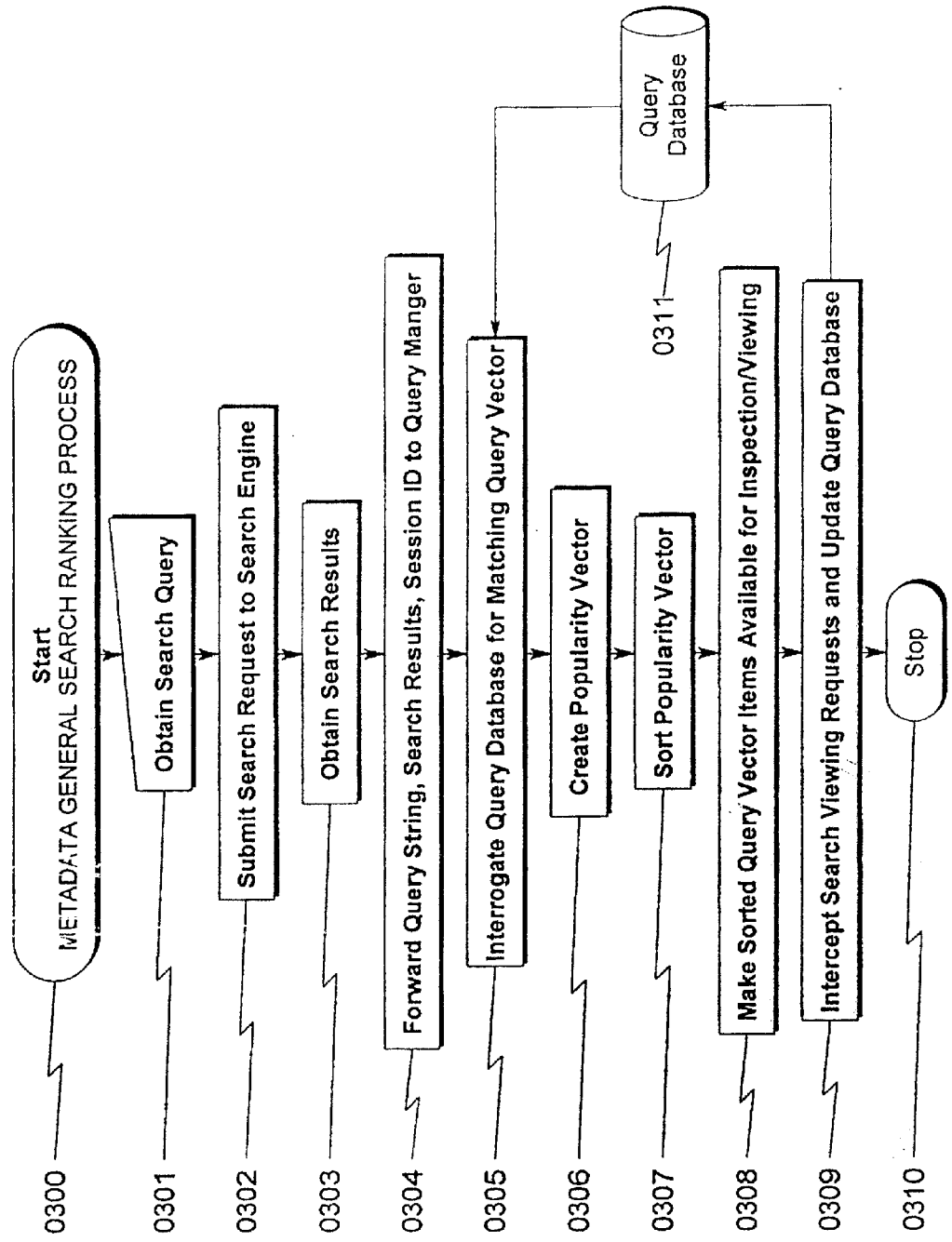
FIG. 3 illustrates a process flowchart of an exemplary embodiment of the present invention.

An exemplary general present invention method may best be understood by referencing the system diagrams of FIG. 1 and the exemplary flowchart of FIG. 3. These diagrams will now be discussed in detail. Referencing FIG. 3, the exemplary general search ranking method (0300) involves the following steps:

Obtaining a search request query string (typically from a user) (0301) and submitting the search request to a session manager.

Submitting the search request to a search engine (0302).

Obtaining search results from the search engine (0303).

Forwarding the query string, search results, and session ID to a query manger (0304).

Using query manager data to interrogate a query database (0311) for matching query vector items (0305).

Creating a popularity vector (0306).

Sorting the popularity vector (0307).

Making the sorted query vector items available to the user (0308).

Intercepting search viewing requests and updating a query database (0311) based on session ID and resource associations (0309).

One skilled in the art will recognize that these steps may be rearranged and/or augmented with no loss of generality in the teachings of the present invention.

Exemplary Alternate Ranking Method

Figure 4:
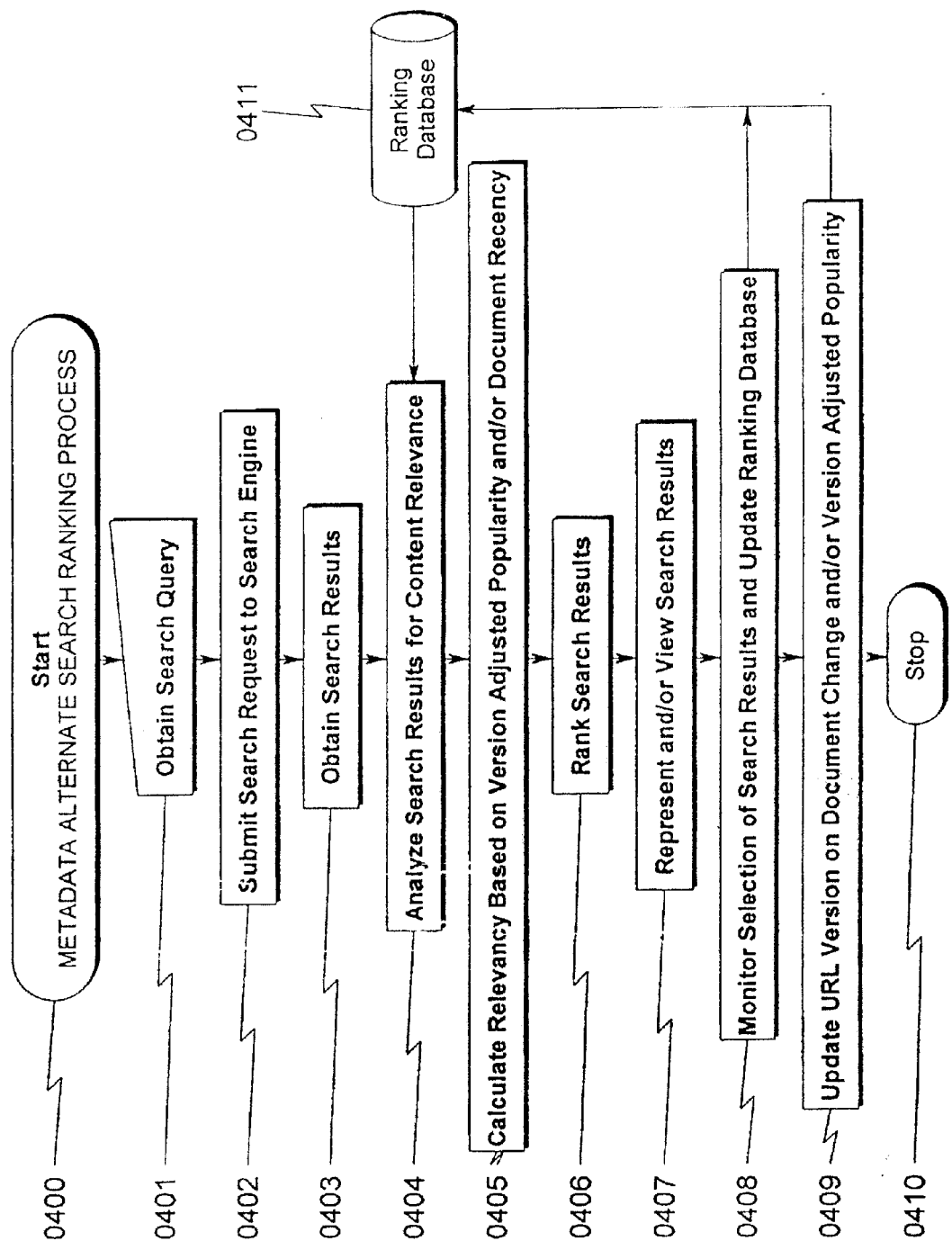
FIG. 4 illustrates a process flowchart of an alternate exemplary embodiment of the present invention.

An exemplary alternate present invention method may best be understood by referencing the system diagrams of FIG. 2 and the exemplary flowchart of FIG. 4. These diagrams will now be discussed in detail.

Referencing FIG. 4, the exemplary alternate search ranking method (0400) involves the following steps:

1. Obtaining a search request query string (typically from a user) (0401) and submitting the search request to a session manager.
2. Submitting the search request to a search engine (0402).
3. Obtaining search results from the search engine (0403).
4. Analyzing the search results for content relevance (0404) using a ranking database (0411).
5. Calculating relevancy based on version adjusted popularity and/or document recency (0405).
6. Ranking the search results based on relevancy (0406).
7. Representing and/or viewing the ranked search results (0407).
8. Monitoring selection of ranked search results and updating the ranking database accordingly (0408).

9. Updating URL version numbers within the ranking database (0411) when there are detected document changes and/or updates to version adjusted popularity information (0409).

One skilled in the art will recognize that these ste s may be rearranged and/or augmented with no loss of generality in the teachings of the present invention.

Query Association Metrics (QAM)

A significant aspect of various embodiments of the present invention is that of Query Association Metrics (QAM) that may be spoken of in terms of the Association (0104) in FIG. 1 and the Relevancy Calculator (0203) of FIG. 2. In both of these examples a variety of information associated with the search query must be evaluated to determine a ranking score that is then used to sort the search results list(s). The general mathematical principles of projective metrics, orthogonal basis vector decomposition, and vector norms are applicable here. See David G. Luenberger, OPTIMIZATION BY VECTOR SPACE METHODS (LOC 68-8716 SBN 471 55359x, 1969); L. E. Franks, SIGNAL THEORY (ISBN 0-941052-00-7, 1981); Erwin Kreyszig, ADVANCED ENGINEERING MATHEMATICS (ISBN 0-471-85824-2, 1988).

While there are a plethora of potential QAM methodologies that are applicable to the present invention, some particular schemes are worthy of note as they have wide application to the problems associated with Internet web searches. The following discussion explains how these particular techniques may be used to advantage within the present invention.

Exemplary Application Background

In applying the present invention to the problem of Internet Search engine technology, it will be observed that users typically enter keywords into an electronic form of a Internet Search Engine. Additionally, some electronic forms provide the possibility to enter complex Boolean queries. Before the query gets submitted to the Internet Search engine, the user input will be parsed and processed, in order that the search engine is able to understand the query command.

System such as "SearchScope" for instance rely on monitoring users query behavior, selections users have made, etc. These user choices are typically stored in a database, using the query string as a key. To enhance search accuracy, however, it is important to be able to compare similarity of queries. What is the difference of a query, issued by User A who queried "CATS and DOGS", and then selected a set of specific search result items, and User B, who queries "DOGS and CATS"? Systems that are comparing similar queries currently rely on parsing the original query string. Although this approach works for a specific sort of query expressions (e.g. Boolean queries), it is difficult to handle different query types. Standard search engines support typically three different query types:

Boolean query (e.g., "CATS and DOGS");
Natural Language query (e.g. "How is the weather in Seattle?"); and
Vector space query (weighted strings) ("CATS[60], DOGS[40]").

The present invention utilizing QAM provides a way of comparing the similarity of search queries from these categories, thus providing a comprehensive scheme of detecting similarity of search queries. This knowledge is then used to enhance the ranking algorithm of a search engine.

QAM Methodology

In an information system, users make queries and a search engine replies with an ordered list of web pages to each query. The users then make choices to determine which of these pages are more preferable. These choices can often be traced and stored to enhance the answer to future queries. One way to enhance a search engine upon receiving a query is to first use the search engine to find its ordered list of web pages for the query, then use the previous data on the preference to reorder the list. This technique will statistically improve the chance that better fit pages are on the top of the list.

How can this be achieved? In the simplest approach, when receiving a query Q and a list of answers R from the search engine, it is instructive to examine whether Q has been asked before. If it has, then it is instructive to incorporate the information from the previous choices (which indicates the preference of the previous users) to reorder the list R.

However, very often users do not make the exactly the same query. Some previous queries are more similar to the current query Q than some others, but maybe none is exactly the same. For example, "how is the weather in SF?" is a closely related query to "SF & Weather", but they are not exactly the same. So the questions to be asked are:

How to measure the similarity among queries?
1. How to use the history of the choices for one query to improve the answer of a similar query?

An example is instructive at this point. Suppose a user made a query (cats $\otimes$ dogs) and received a ranked list of web pages given in their URLs. In this context a ranked list means that the web pages are given in a sorted order according to the scoring function of the search engine. Suppose, in addition, the user or some other users had already made a query on (cats $\oplus$ dogs), and had already ranked the list of the web pages according to the relevancy to (cats $\oplus$ dogs). How can the user-ranked list for (cats $\oplus$ dogs) be used to further enhance the order of the list given by the search engine for (cats $\otimes$ dogs)? What is the similarity between the queries (cats $\oplus$ dogs) and (cats $\otimes$ dogs)?

Suppose URL1, URL2, URL3, and URL4 are ranked in the order of the best interests for (cats $\oplus$ dogs), and URL4 and URL2 are returned by the search engine for (cats $\otimes$ dogs) according to its own scoring. Then it can be concluded, according to the previous data for (cats $\oplus$ dogs), that URL2 may be more preferred than URL4. Here is an argument: A web page satisfying (cats $\otimes$ dogs) must also satisfy (cats $\oplus$ dogs). Hence, the lists of web pages that satisfy (cats $\otimes$ dogs) is a logical projection and a subset of the list of web pages that satisfy (cats $\oplus$ dogs). In this projective sense, URL2 is more preferred than URL4, when the user ranked the query result for (cats $\oplus$ dogs). Even though URL3 is ranked in between URL2 and URL4 in the list for (cats $\oplus$ dogs), the relative ranking provided with URL2 and URL4 are correct in a logical projection sense (assuming a monotonic mapping metric) for the query (cats $\otimes$ dogs). So the projective ordering given for (cats $\oplus$ dogs) could be used fully for (cats $\otimes$ dogs).

It is now instructive to look at the searching problem from the other direction. Suppose a user has a ranked list of URLs for query (cats $\otimes$ dogs) as URL4 and URL2. Suppose then a new query (cats $\oplus$ dogs) is issued and the user obtained an ordered list from the search engine as {URL1, URL2, URL3, URL4}. How much information for (cats $\otimes$ dogs) can be used in this case? Clearly, there is no additional information provided between URL1 and URL2 or URL1 and URL4. But in the projective sense, URL4 is more preferred than URL2, and should move up the list. But there is no justification to move URL4 over URL1. Thus, a reasonable reordering for (cats ⊕ dogs) is {URL1, URL4, URL2, URL3}. URL4 is moved above URL3 because by the scoring result of the search engine, URL2 is more preferred than URL3, while by the previous data for (cats ⊗ dogs), URL4 is more preferred than URL2, and hence may be more preferred than URL3.

As the result above indicates, the impact of (cats ⊗ dogs) to (cats ⊕ dogs) is much weaker than that of (cats ⊕ dogs) to (cats ⊗ dogs). Therefore, the similarity between queries is not symmetric. This will be verified by the projective similarity example given below.

QAM Partitioning Example

As an example of this technique, consider two queries Q1 and Q2. How should the previous data for Q1 be used to enhance the ordering for a list of returned pages for Q2? Here a method based on the projective similarity between Q1 and Q2 is presented.

The two queries divide the space of web pages into four sets:

{A}: the set of pages that satisfy Q1 but not Q2.
1. {B}: the set of pages that satisfy both Q1 and Q2.
2. {C}: the set of pages that satisfy Q2 but not Q1.
3. {D}: the set of pages that neither satisfy Q1 nor Q2.

So {B} is the only common sub-set for both Q1 and Q2. The set {B} will be referred to as the projective sub-set between Q1 and Q2 (Q1 onto Q2), and denote it as QamProjection(Q1,Q2).

The set {A} will be referred to as QamPages(Q1) and set {C} as QamPages(Q2). The degree of projective similarity from Q2 to Q1 is then $$QamSimilarity(Q2 \to Q1) = \frac{|QamProjection(Q2, Q1)|}{|QamPages(Q1)|} \quad (1)$$

and the degree of projective similarity from Q1 to Q2 is then $$QamSimilarity(Q1 \to Q2) = \frac{|QamProjection(Q1, Q2)|}{|QamPages(Q2)|} \quad (2)$$

For example, $$QamSimilarity((\text{cats} \oplus \text{dogs}) \to (\text{cats} \otimes \text{dogs})) = 1 \quad (3)$$

while $$QamSimilarity((\text{cats} \otimes \text{dogs}) \to (\text{cats} \oplus \text{dogs})) = \frac{1}{3} \quad (4)$$

This is the reason why the impact of (cats ⊗ dogs) to (cats ⊕ dogs) is much weaker than that of (cats ⊕ dogs) to (cats ⊗ dogs).

Enhancement with Previous Data for the Same Query

The basic method for using prior data to enhance a returned list of search results will now be discussed. Following this discussion a few practical modifications of this method will be presented.

It is instructive to first illustrate how to use the previous selections of the same query to improve its future ordering. The algorithm has several components. The basic QAM component is called QamPermute. It takes two parameters:

The first parameter is $R=(r[1], \ldots, r[t])$, which is an ordered list of web pages returned by the search engine. There is a weight value $w(r[i])$ associated with the web page $r[i]$, measuring the degree of match and is calculated by the search engine. In other words, $R=(r[1], \ldots, r[t])$ is sorted according to w.

The second parameter is a t-place vector c, measuring the selection weight given by the previous data. For example $c(r[i])$ can be the number of times that the web page $r[i]$ had been selected (with 0 indicating that it has never been chosen), or some kind of weight to measure the degree of preference of $r[i]$ in the history.

It is assumed that a primitive function $s(w,c)$ is given which maps a pair of real number to a real number. Intuitively, $s(w(r[i]),c(r[i]))$ computes the degree of preference of the web page $w[i]$ given the matching weight $w(r[i])$ returned by the search engine and preference weight $c(r[i])$ given by the previous searches. In practice, $s(w,c)$ is monotonically increasing in both of its parameters.

The component QamPermute can now be defined as the following:

QamPermute(R,c)
1. Compute $s(w(r[i]),c(r[i]))$.
2. Sort R in a decreasing order according to $s(w(r[i]),c(r[i]))$.

Suppose the search engine has been queried with Q and a list of web pages R(Q) has been obtained. We have selected some subset of R(Q) as to be the most fitting ones. The history of these selections was recorded in c. Suppose now some new user comes and queries the search engine with Q as well, we will then return QamPermute(R(Q),c). QamPermute allows enhancement of a list of returned web pages by the previous data for the exactly same query. However, in general, it is more beneficial to enhance the output based on previous data on similar by not exactly the same queries. Here the idea of projection and projection similarity is utilized.

Enhancement with Previous Data for a Similar Query

This section describes a method for enhancing the ordering of a list of returned web pages with previous data on a similar query. We first discuss one of its components, called QamPartialPermute. It has three parameters:

The first parameter is $R=(r[1], \ldots, r[T])$, returned by the search engine and its weight vector w( ). Again $R=(r[1], \ldots, r[T])$ is sorted according to w.
1. The second parameter is a T-place vector m, called the mask, whose entries are either 0 or 1. We use the mask vector to encode the projection from one query to another.
2. The third parameter is again a T-place vector c, measuring the selection weight given by the previous data. Technically, $c(r[i])$ is meaningful only if $m(i)=1$. Again, we assume to be given a function $s(w,c)$.

An example of this function follows:
QamPartialPermute(R,m,c)
1. for each i such that $m(i)=1$, compute $s(w(r[i]),c(r[i]))$.
2. compute the sorted order of $s(w(r[i]),c(r[i]))$'s with $m(i)=1$ in an increasing order. Call this order $p(1),p(2), \ldots, p(L)$, where L is the number of the marked entries.

3. following the order given in step 2, for j=2 to L,
   1. let h=p(j) and g=p(j−1)
   2. if r[h] is higher in R than r[g], then move r[h] just in front of r[g].
4. return R.

An application example is in order. Suppose R=(r[1], r[2], r[3], r[4], r[5], r[6], r[7], r[8]) and m=[0 1 0 1 0 1 0 1], and the sorting in the second step results p(1)=4, p(2)=8. p(3)=2, and p(4)=6. The first sub-step of step 3 moves above r[4] (given by p(1)), the second sub-step did not move r[2], and the last sub step move r[6] above r[2]. Hence we have (r[1], r[6], r[2], r[3], r[8], r[4], r[5], r[7]). In other words, QamPartialPermute properly moves up a marked entry so that the marked entry are properly sorted according to s(w(r[i]),c(r[i])).

Suppose Q[1] is a query that we would like to use to enhance R(Q). The mask vector m is then given as the characteristic vector for the intersection of R(Q) and projection(Q1,Q). The vector c hence measures the selection weight given by the previous data with query Q1. The procedure QamEnhance(Q,Q[1]) first computes the mask vector, and then applies QamPartialPermute.

QamEnhance(Q,Q[1])
1. compute the mast vector m from R(Q) and R(Q[1])
2. retrieve the selection vector c for pages in R(Q[1])
3. return QamPartialPermute(R(Q),m,c).

So the basic idea behind QamEnhance is to first find the subset of common web pages between Q and Q[1], referred as the projection from Q[1] to Q, and then use the previous data of Q[1] to improve the ordering of this projective sub-lists.

Enhancement with Previous Data for Similar Queries

Suppose we have already made k queries with Q[1], Q_2, ... ,Q[k], with ordered web pages R(Q[1]), ... ,R(Q[k]), respectively. Suppose we are making a new query Q. Let R be the returned result from the search engine. We iteratively enhance the quality of the list of R(Q) as following.

QamEnhance(R(Q),[R(Q[1]), ... ,R(Q[k])])
1. Compute s[1]=QamSimilarity(Q1->Q), ... ,s[k]= QamSimilarity(Q[k]->Q).
2. Sort {s[1], ... ,s[k]) in the increasing order, wlog, assume {s[1], ... ,s[k]} is already sorted.
3. For i=1 to k,
   1. R(Q)=QamEnhance(R(Q),R(Q[i]));
4. Return R(Q).

We improve the ordering of R(Q) by a list of queried results from the weakest projective similarity to the strongest projective similarity. Score Enhancing Methods: Sampling for Practical Implementations We have presented a theoretical version of the score-enhancing algorithm. However, there are several difficulties in implementing this algorithm:
1. The computation of QamSimilarity.
2. The computation of the mask vector QamMaskVector.
3. The potentially large number of the queries.

In this section, we will address these issues and design more practically suitable approximations of our theoretical version of the algorithm.

This basic idea we will use here is sampling. We will use the results from the search engine to help the approximation of the similarities and mask vectors. We will use two parameters in the following method:

The first parameter is T, which is the number of the pages that we could like to reorder. In other words, after obtain a list of web pages from the search engine; we will only reorder the top T pages.

1. The second parameter is t, which is the number of web pages that we will use as the sample of a query.

In practice t is around 25 and t<T. But in this discussion, we will use a parameter rather than a fixed constant.

When a user asks a query Q[1], the search engine returns a list of web pages weighted by the matching scores computed by the search engine. Let R[t(Q[1])] be the top t pages. The user will make some selections, either from the top t pages or beyond. Let S(Q[1]) be the union of R[t(Q[1])] and the set of pages selected by the user. S(Q[1]) is the sampled space of web pages for query Q[1]. For each web page in S(Q[1]), we maintain its selection weight. The weight is 0 if a web page in S(Q[1]) which is not selected. Otherwise, for a web page in S(Q[1]) that is selected, this weight is the degree of preference. This gives the c( )vector for the selected and sampled pages.

Suppose now the user asks another query Q and the search engine returns a list of web pages. Again weighed by the matching scores. Let R[T(Q)] be the set of tope T pages that we would like to enhance. Then the similarity factor will be approximated as $$QAMsimilarity(Q[1] \to Q) \approx \frac{|S(Q[1]) \cap R[T(Q)]|}{|R[T(Q)]|} \quad (5)$$

The mask vector will simply be the vector of characteristics of S(Q[1]) in R[T(Q)]. So to use Q[1] to improve Q, we only reorder among the set of pages in common with S(Q) and R[T(Q)].

With this sampling based approximation, we are able to support the algorithm QamEnhance efficiently. We now discuss the details below. Associate with each query, let S(Q) be the sample maintained for query Q. For each web page p in S(Q), let c(p) denote the weight of preference of the page p in S(Q). Let R[T(Q)] and R[t(Q)] be the top T and t, respectively, pages returned by the search engine.

This following procedure masking vector computes the mask vector m and the number of common pages in S(Q[1]) and R[T(Q)].

[common,m]=QamMaskingVector(Q,Q1,T)
1. common=0;
2. Initialize the mask vector m as a T-place all zeros vector.
3. for i=1 to T, enumerate the page in R[T(Q)],
   1. if the ith page is in S(Q[1]), then m[i]=1;
   2. if the ith page is not in S(Q[1]), then m[i]=0;
4. common=common+1;
5. Return common and m.

QamScoreEnhance(R[T(Q)],Q[1], T, t,m)
1. Assume R[T(Q)]=(r[1]. . . ,r[T]), in the order returned by the search engine.
2. for i=1 to T,
   1. for each i such that m(i)=1, compute s(w(r[i]),c(r[i])), where c(r[i]) is given in S(Q[1]);
3. Compute the sorted order of s(w(r[i]),c(r[i]))'s with m(i)=1 in an increasing order. Call this order p(1),p(2), ... ,p(L), where L is the number of the marked entries.

4. QamPartialPermute: following the order given in step 2, for j=2 to L,
   1. let h=(j) and g=(j−1)
   2. if r[h] is higher in R[T(Q)] than r[g], then move r[h] just in front of r[g].
5. Return R[T(Q)].

Suppose we have already made k queries with Q[1], Q_2, . . . ,Q[k]. Suppose we are making a new query Q. Let R(Q) be the returned result from the search engine. We iteratively enhance the quality of the list of R0 as follows: QamEnhance(R(Q),[Q[1], . . . ,Q[k]])
1. for i=1 to k;
   1. [common[i], m[i]]=QamMaskingVector(Q,Q1,T)
2. Sort {common[1], . . . ,common[k]} in the increasing order, so wlog, assume it is already sorted.
3. R(Q)=R[T(Q)];
4. For i=1 to k,
   1. R(Q)=QamScoreEnhance(R(Q),Q[i],T,t,m[i]);
5. Return R(Q).

In practice, we do not need to use all of the previous queries to improve the current query. We only need to use the top few (perhaps) five queries with the highest similarity. We will discuss this issue in the implementation section.

Types Queries and Practical Justification of Projection and Sampling

The sampling based projection scheme developed effectively combines the power of a search engine and the preference given by users' selection. Our method does not depend on the format of the query and treat the search engine as a black box. For example, the enhancing method does not need to know how the search engine processes a query such as "How is the weather in SF?". The similarity between two queries, such as "How is the weather in SF?" and (Weather & SF), is surely a function of the search engine. If the search engine only look for document, which exactly contains the sentence "How is the weather in SF?", then the similarity between these two queries will be very small. On the other hand, if the search engine interprets the query "How is the weather in SF?" as (current & weather & SF), then the similarity between these two queries will be much larger. However, as a post-process mechanism, it is more effective in practice to have a plug-in method, a method does not need to know the semantic of the search engine. Below, we survey the types of queries supported by the search engine for the IBM jCentral site.

An important feature of our method is that it does not need to processor the query in a semantic way in order to improve the quality of the search results. It treats the query as an explicit set given by a proper sample from the search engine and user's selections.

Exemplary Search Syntax

Boolean Operators

The concept of projective similarity allows us to make use of the previous results on closely related queries, with too much additional cost in processing these queries. The basic principle of our approach is the proper combination of the weighting score from the search engine as well as the selection data for previous queries. We will illustrate these points after giving the detailed discussion of these queries.

Boolean Operators

One of the main reasons of using the projective similarity and sampling as the means to enhance a list of Boolean Operators.

| Word | Symbol | Description | For Example |
|---|---|---|---|
| AND | & + | AND or & or + returns pages containing all the query terms. | bubble AND sort returns pages that contain both of the terms; that is, the term sort and the term bubble. |
| OR | \| | OR or \| returns all pages that have either query term. | applet OR "source code" returns pages containing one or both terms; that is, pages that include only applet, pages that include only "source code" and pages that include applet and "source code". |
| NOT | ! − | NOT or ! or − returns pages that do not contain the query term that follows. | tree NOT binary returns any pages that include tree, but don't include binary. |

Query Modifiers

| Word | Symbol | Description | For Example |
|---|---|---|---|
| quotation marks | " " | Quotation marks (" ") are used to denote exact phrases. | A search on "Java Virtual Machine" only matches documents containing the exact phrase. It doesn't return pages with the words used in a different order, such as "Virtual Machine Java". |
| parentheses | ( ) | By default, AND has a higher precedence than OR. To change the precedence order, use the parentheses. | When searching for terms like jit, "Just In Time" and Symantec. One possible query would be: (jit OR "Just In Time") AND Symantec |

Wildcard Character jCentral allows the use of the asterisk (*) as a wildcard character in searches. The following table describes how this character can be used to expand searches:

| To search for . . . | Symbol | Use the format . . . | For example . . . |
|---|---|---|---|
| Keywords with the same prefix | * | prefix* | program*, yields search results containing words that that have the prefix "program", such as "programs", "programming", "programmer", and so on |
| Words based on the same stem word | ** | stem** | try**, yields search results containing words based on the stem word "try", such as "trying", "tried", "tries", and so on |

Proximity (Near) Operator jCentral allows searches based on the proximity of word or strings. The following table describes this feature:

| To search for ... | Use the Symbol format ... | | For example ... |
|---|---|---|---|
| Two words or strings in the same file, close together | near ~ | string1 near string2 or word1~word2 | database near tool, yields search results in which the word "database" is near the word "tool" |

The near operator returns a match if both of the words being searched for are in the same file. The ranking of the match depends on the proximity of the searched-for words. That is, the ranking of a file in which the searched-for words are closer together is greater than or equal to the ranking of a file in which the words are farther apart. If the searched-for words are more than 50 words apart, they are not considered near enough, and the page is assigned a ranking of zero.

Weighted Strings jCentral allows a web searcher to assign a numerical weight to a word or string to influence the ranking of the search results (Vector Space queries). The greater the weight you assign, the higher the matching results are ranked. The following table describes this feature:

| To search for ... | Use the format ... | For example ... |
|---|---|---|
| Pages that contain specific words | word1, word2 | Java resources with words that best match the words being searched for |
| Pages that contain weighted prefixes, words, and phrases | prefix, word[weight], phrase[weight] | remote*, method[50], data[20], "procedure call" [200] yields search results that contain words prefixed by remote, the words method, data, and the phrase procedure call (the terms are weighted) |

Search Examples

| This search string ... | Yields ... |
|---|---|
| quick sort | Search results that contain both quick and sort |
| "quick sort" | Search results that contain the phrase "quick sort" |
| algorithm, sort* | Search results that contain the word "algorithm" or words with the prefix "sort". |
| multi* near thread* | Search results that contain words starting with "multi" appearing near words starting with "thread" |
| play** | Search results that contain the words "play", "player", "playing", "played", and so on |

Search results are ranked using percentages. The higher the percentage given, the more closely the result matched the search criteria. (100% is the highest ranking.)

Set Approach: Approximating Queries with Samples

An important feature of our method is that it does not need to process the query in a semantic way in order to improve the quality of the search results. It treats the query as an explicit set given by a proper sample from the search engine and user's selections. This provides a uniform treatment of all kinds of queries without too much overhead, and allows us to measure the similarity between queries such as 1. sorting[50], selection[10], binary_search[30]
2. sorting[80], selection[1], binary_search[19]
3. quick and sort
4. binary_search, data base, sort*
5. "quick sort"

using the guessing semantic logic of a search engine. In doing so, it does put a lot of trust and faith in the quality of the search engine. For example, for a search engine that does not handle weighted vector query, (sorting [80] and binary_search[20]) may be treated as the same query as (sorting[50] and binary_search[20]). In this case, based on our set approach with sampling, the similarity between them is greater than the similarity measured when we use a search engine that processes the weighted query. In any practical sense, our projective approach provided a proper treatment of the query result returned by a search engine, proportional to the internal semantics of the search engine. In other words, the search engine itself provided the proper distribution for the measurement of the similarity between queries and hence the impact in the reordering.

Data Structures and Implementation Details

We now address the implementation details of our method with the focus on the data structures. The method has three data components:

1. History: recording the queries processed before and its samples and their preference value.
2. Current query Q: a user entered query.
3. Search result R(Q): a sorted list of web pages (given in URLs) returned by the search engine.

The search result R(Q) is can be stored in an array or a linked list. Every element contains the URL and its weight (the w vector) given the search engine. The history part is a tabulate data. Each entry has 1. The query.
2. The list or an array of sampled web page in which every element contains the URL and its selection weights (the c vector).

To compute the similarity and the mask vector, we need a data structure to determine, given an URL, which query in the history table contains the URL as well as the selection weight in the sample of that entry. We will use a hash table HASH to support this operation. In HASH the key is the URL. If the URL is not in the history, then the content entry is an empty list; otherwise, the content entry a list of the entries in the history table to indicate the collection of queries whose samples contains the URL. Therefore, given an URL, we are able to locate quickly the list of previous queries whose samples contain the URL.

We now introduce another hash table, QamHash to help the computation of the mask vector and the projective similarities. The key entry is the id for previous queries. The content entry contains a variable called common, and T-place vector, m, for the mask, and a T-place vector, c, for the preference value.

1. let $R[T(Q)]=(r[1], \ldots ,q[T])$ be the set of top T pages for query Q.
2. for i=1 to T,
   1. let p* be the list of previous queries that contains r[i]; p* can be obtained from HASH.

2. for each query in p*, we update its entry in QamHash: we add 1 to its common, assign the ith entry of its m vector 1, and assign the ith entry of its c vector properly.

3. return QamHash.

QamHash contains all the previous queries that has a non-empty overlap in web pages with R[T(Q)]. For each such a query, we also compute its mask vector and the degree of similarity.

Summary

While there are a wide variety of existing methodologies that attempt to standardize the original query string to detect similarity between search queries, the present invention does not depend on the semantic parsing of the search string to achieve this standardize ranking information. Instead, it utilizes the search result set itself to detect similarity which is a different approach from the prior art and provides a variety of advantages as described above.

Computer Software

As would be known by one skilled in the art and as indicated in FIGS. 1–4, the system and method described herein and generally illustrated in FIGS. 1–4 may be reduced to computer instruction codes and embodied on a computer readable storage means. This may take the form of a wide variety of storage media well known in the art and/or contemplated for future use. Thus, the present invention specifically anticipates the incorporation of the system and methods discussed herein in the form of tangible computer software products.

Furthermore, while not limiting the scope of the present invention, the present invention specifically anticipates that one or more components of the present invention may be implemented using the Microsoft™ Windows™ operating environment in all its variations or its equivalent commercial embodiments, including but not limited to any system incorporating a graphical user interface.

A metadata search results ranking system and method have been disclosed wherein popularity and/or recency may be utilized to improve search results as compared to the prior art. The present invention's use of adaptive human interaction to improve future search results provides for a self-correcting nature that both improves future search results and permits current search results to be more easily interpreted and filtered by the interactive user.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A metadata search ranking system comprising:

a session manager;

a query manager;

a popularity sorter; and an association;

wherein said session manager applies search requests to a search engine and retrieves said search engine results in the form of a first resource list;

said query manager receives said search requests and information identifying a current session from said session manager and interrogates a query database, producing from said interrogation a popularity vector, including said search requests and a popularity indicator, and a second resource list including resources that match said popularity vector;

said popularity sorter receives said popularity vector and said second resource list from said query manager and said first resource list and said information identifying the current session from said session manager, producing a sorted resource list that is provided to said session manager; and said association receives said sorted resource list and said information identifying the current session from said session manager and updates said query database based on this data, for use with subsequent sessions.

2. The metadata search ranking system of claim 1 wherein one or more components of said system is implemented on a personal computer (PC).

3. The metadata search ranking system of claim 2 wherein said personal computer (PC) utilizes a graphical user interface.

4. The metadata search ranking system of claim 3 wherein said graphical user interface utilizes a Microsoft™ Windows™ operating environment.

5. A metadata search ranking system comprising:

a session manager means;

a query manager means;

a popularity sorter means; and an association means;

wherein said session manager means applies search requests to a search engine and retrieves said search engine results in the form of a first resource list;

said query manager means receives said search requests and information identifying a current session from said session manager means and interrogates a query database means, producing from said interrogation a popularity vector, including said search requests and a popularity indicator, and a second resource list including resources that match said popularity vector;

said popularity sorter means receives said popularity vector and said second resource list from said query manager means and said first resource list and said information identifying the current session from said session manager means, producing a sorted resource list that is provided to said session manager means; and said association means recieves said sorted resource list and said information identifying the current session from said session manager means and updates said query database means based on this data, for use with subsequent sessions.

6. The metadata search ranking system of claim 5 wherein one or more components of said system is implemented on a personal computer (PC).

7. The metadata search ranking system of claim 6 wherein said personal computer (PC) utilizes a graphical user interface.

8. The metadata search ranking system of claim 7 wherein said graphical user interface utilizes a Microsoft™ Windows™ operating environment.

9. A metadata search ranking method comprising:

obtaining a search request query string and submitting said search request query string to a session manager;

submitting said search request query string to a search engine;

obtaining search results in the form of a first resource list from said search engine;

forwarding said search request query string, and a session ID to a query manger;

using said search request query string to interrogate a query database;

creating a popularity vector, including said search request query string and a popularity indicator;

generating a second resource list including resources that match said popularity vector;

sorting said first resource list and said second resource list;

making said sorted first resource list and second resource list available for inspection; and intercepting search viewing requests of said sorted first resource list and second resource list and updating said query database based on session ID and resource associations.

10. The metadata search ranking method of claim 9 wherein one or more steps is implemented on a personal computer (PC).

11. The metadata search ranking method of claim 10 wherein said personal computer (PC) utilizes a graphical user interface.

12. The metadata search ranking method of claim 11 wherein said graphical user interface utilizes a Microsoft™ Windows™ operating environment.

13. A metadata search ranking method comprising:

means for obtaining a search request query string and submitting said search request query string to a session manager;

means for submitting said search request query string to a search engine;

means for obtaining search results in the form of a first resource list from said search engine;

means for forwarding said search request query string, and a session ID to a query manger;

means for using said search request query string to interrogate a query database;

means for creating a popularity vector, including said search request query string and a popularity indicator;

means for generating a second resource list including resources that match said popularity vector;

means for sorting said first resource list and said second resource list;

means for makinq said sorted first resource list and second resource list available for inspection; and means for Intercepting search viewing requests of said sorted first resource list and second resource list and updating said query database based on session ID and resource associations.

14. The metadata search ranking method of claim 13 wherein one or more steps is implemented on a personal computer (PC).

15. The metadata search ranking method of claim 14 wherein said personal computer (PC) utilizes a graphical user interface.

16. The metadata search ranking method of claim 15 wherein said graphical user interface utilizes a Microsoft™ Windows™ operating environment.

17. A computer usable medium having computer-readable program code means providing metadata search ranking, said computer-readable program means comprising:

computer program code means for obtaining a search request query string and submitting said search request query string to a session manager;

computer program code means for submitting said search request query string to a search engine;

computer program code means for obtaining search results in the form of a first resource list from said search engine;

computer program code means for forwarding said search request query string, and a session ID to a query manger;

computer program code means for using said search request query string to interrogate a query database;

computer program code means for creating a popularity vector, including said search request query string and a popularity indicator;

computer program code means for generating a second resource list including resources that match said popularity vector;

computer program code means for sorting said first resource list and said second resource list;

computer program code means for making said sorted first resource list and second resource list available for inspection; and computer program code means for intercepting search viewing requests of said sorted first resource list and second resource list and updating said query database based on session ID and resource associations.

18. The computer usable medium of claim 17 wherein said medium is compatible with a personal computer (PC).

19. The computer usable medium of claim 18 wherein said computer code means utilizes a graphical user interface.

20. The computer usable medium of claim 19 wherein said graphical user interface utilizes a Microsoft™ Windows™ operating environment.

* * * * *